(12) United States Patent
Laflin et al.

(10) Patent No.: US 12,534,212 B1
(45) Date of Patent: Jan. 27, 2026

(54) PASSIVE, LOW-DRAG DEVICE FOR PYLON-NACELLE JUNCTURE FLOW SEPARATION MITIGATION

(71) Applicant: Textron Aviation Inc., Wichita, KS (US)

(72) Inventors: Kelly Ray Laflin, Wichita, KS (US); Mark Steven Chaffin, Andover, KS (US)

(73) Assignee: Textron Aviation Inc., Wichita, KS (US)

( * ) Notice: Subject to any disclaimer, the term of this patent is extended or adjusted under 35 U.S.C. 154(b) by 0 days.

(21) Appl. No.: 19/061,596

(22) Filed: Feb. 24, 2025

(51) Int. Cl.
  *B64D 29/06* (2006.01)
  *B64C 7/02* (2006.01)

(52) U.S. Cl.
  CPC ............... *B64D 29/06* (2013.01); *B64C 7/02* (2013.01)

(58) Field of Classification Search
  CPC ........ B64D 27/20; B64D 27/14; B64D 27/08; B64D 29/04
  See application file for complete search history.

(56) References Cited

U.S. PATENT DOCUMENTS

| | | | | |
|---|---|---|---|---|
| 4,314,681 A | * | 2/1982 | Kutney | B64D 29/02 244/54 |
| 2014/0374566 A1 | * | 12/2014 | Fernando | B64D 27/402 248/554 |
| 2017/0088276 A1 | * | 3/2017 | Gruber | B64D 27/20 |
| 2020/0283160 A1 | * | 9/2020 | Sadri | B64D 27/18 |

* cited by examiner

*Primary Examiner* — Nicholas McFall
*Assistant Examiner* — Eric Acosta
(74) *Attorney, Agent, or Firm* — Hovey Williams LLP (57) ABSTRACT

An aircraft or aircraft body having an airframe structure, a pylon, a protrusion, and a nacelle. The airframe structure is a wing or a fuselage. The pylon has a first end, a second end opposite the first end, a first surface extending between the first end and the second end, and a second surface opposite the first surface. The first end is fixed to the airframe structure. The protrusion extends outward from the first surface and/or the second surface. The nacelle is located at the second end of the pylon and has a leading end, a trailing end, and a tapered boattail at the trailing end. The protrusion is located between the airframe structure and the tapered boattail. The protrusion is sized, shaped, and positioned between the boattail and the fuselage or wing to mitigate boundary layer separation.

17 Claims, 10 Drawing Sheets

PASSIVE, LOW-DRAG DEVICE FOR PYLON-NACELLE JUNCTURE FLOW SEPARATION MITIGATION

BACKGROUND OF THE INVENTION

When a fluid or gas (e.g., air) flows over a surface, the fluid or gas in immediate contact with the surface adheres to it due to viscosity, creating a thin layer of fluid or gas known as a boundary layer. The boundary layer has zero velocity at the surface and gradually increases in velocity as the normal distance from the surface increases until matching the local free stream velocity of the fluid or gas.

Figure 1:
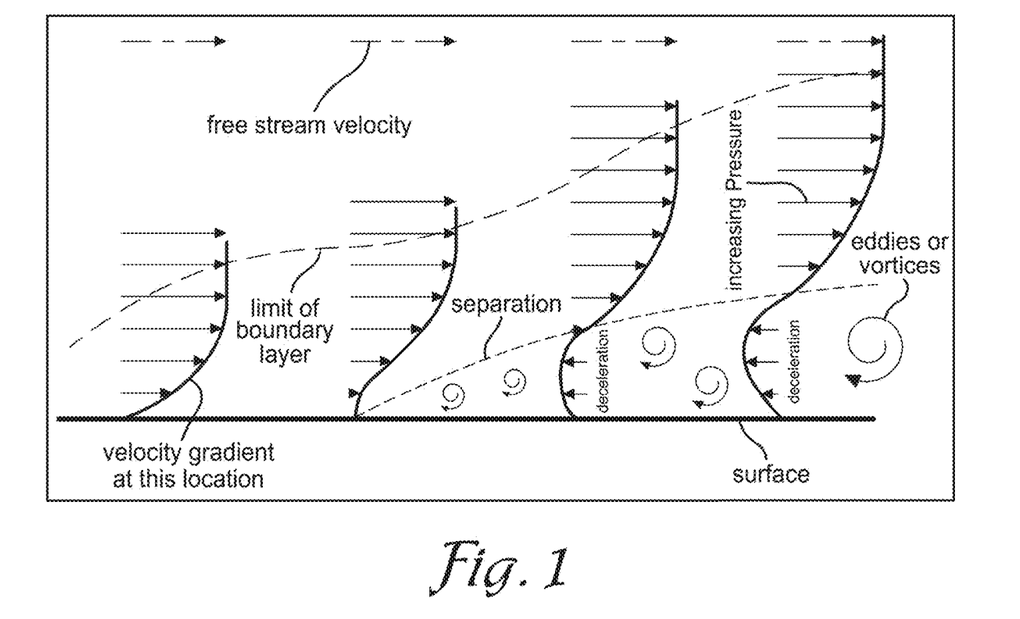
FIG. 1 is a diagram depicting boundary layer separation of air flow in the presence of an adverse pressure gradient.

A fluid or gas flow encountering an adverse pressure gradient will decelerate, as the increasing pressure is in opposition to the fluid or gas momentum. When the fluid or gas slows too much, its boundary layer can no longer adhere to a surface. The point at which the fluid detaches from the surface is called the separation point. Beyond this point, the turbulence level of the fluid increases and eddies and vortices form, as depicted in FIG. 1, which depicts an air flow diagram of boundary layer separation in the presence of an adverse pressure gradient.

Boundary layer separation is generally undesirable over aircraft surfaces because it increases drag, reduces lift, increases noise, and can cause airframe vibration that can potentially lead to structural and/or system damage or failure. It is common for boundary layer separation to occur at the junction of two perpendicular or near-perpendicular surfaces, because the interaction of the boundary layers of the two intersecting surfaces creates fluid stresses and instabilities that tend to make the fluid in the surface juncture region more sensitive to adverse pressure gradients.

Thus, there is a need for a modification of an engine mounted pylon that overcomes the deficiencies of the prior art.

SUMMARY OF THE INVENTION

Embodiments of the current invention address one or more of the above-mentioned problems and provide a distinct advance in the art of aircraft air flow. In one embodiment, an aircraft body has an airframe structure, a pylon, a protrusion, and a nacelle. The pylon has a first end, a second end opposite the first end, a first surface extending between the first end and the second end, and a second surface opposite the first surface. The first end is fixed to the airframe structure. The protrusion extends outward from the first surface and/or the second surface. The nacelle is located at the second end of the pylon and has a leading end, a trailing end, and a tapered boattail at the trailing end. The protrusion is located between the airframe structure and the tapered boattail.

In another embodiment, an aircraft includes a fuselage, a pylon, a first protrusion, an aircraft engine, and a nacelle. The pylon has a first end, a second end opposite the first end, a first surface extending between the first end and the second end, and a second surface opposite the first surface. The first end of the pylon is fixed to the fuselage. The first protrusion extends outward from the first surface of the pylon, and the aircraft engine is fixed to the second end of the pylon. The nacelle extends around the aircraft engine and has a leading end, a trailing end, and a tapered boattail at the trailing end. The first protrusion is located between the fuselage and the tapered boattail and has a protrusion leading end, a protrusion trailing end, and a middle section somewhere between the protrusion leading end and the protrusion trailing end. The cross-sectional area of the first protrusion gradually expands in size from the protrusion leading end to the middle section. The middle section is a widest and/or a tallest part of the first protrusion and is laterally aligned with the trailing end of the nacelle.

In yet another embodiment, an aircraft body includes aircraft external surfaces cooperatively forming a channel extending in a forward to aftward direction, a juncture at which two adjacent ones of the aircraft external surfaces meet, and a protrusion. An aft portion of the channel gradually increases in cross-sectional area in the forward to aftward direction. The protrusion extends outward from one of the two adjacent ones of the aircraft external surfaces into the aft portion of the channel. The protrusion is spaced apart from the juncture and is sized and shaped to mitigate boundary layer separation within the aft portion of the channel when a flow of air moves through the channel in the forward to aftward direction.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF DRAWINGS

Embodiments of the current invention are described in detail below with reference to the attached drawing figures, wherein.

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE INVENTION

The following detailed description of the technology references the accompanying drawings that illustrate specific embodiments in which the technology can be practiced. The embodiments are intended to describe aspects of the technology in sufficient detail to enable those skilled in the art to practice the technology. Other embodiments can be utilized and changes can be made without departing from the scope of the current invention. The following detailed description is, therefore, not to be taken in a limiting sense. The scope of the current invention is defined only by the appended claims, along with the full scope of equivalents to which such claims are entitled.

Boundary layer separation of air flow is generally undesirable over aircraft surfaces because it increases drag, reduces lift, increases noise, and can cause airframe vibration that can potentially lead to structural and/or system damage or failure. A juncture flow region that exists in the presence of a strong adverse pressure gradient can occur, for example, on aircraft with pylon mounted engines, where the pylon intersects with a nacelle boattail, causing undesirable boundary layer separation.

Figure 2:
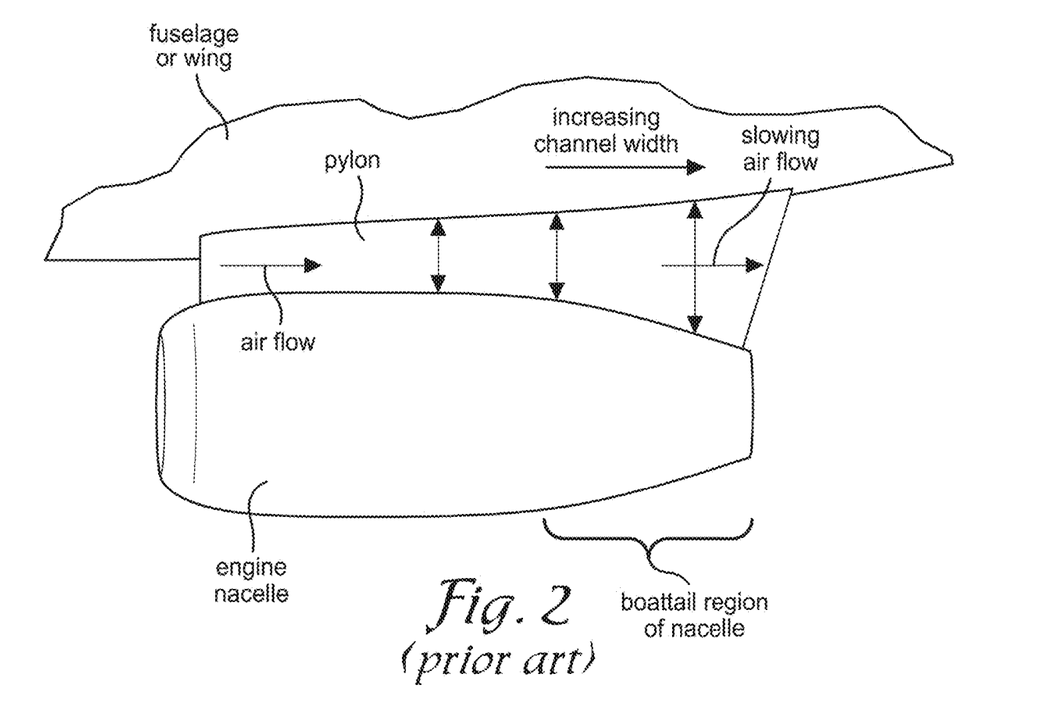
FIG. 2 is a fragmentary elevation view of a prior art aircraft depicting a pylon mounted engine, where the pylon intersects with a boattail of a nacelle surrounding the engine.
Figure 3:
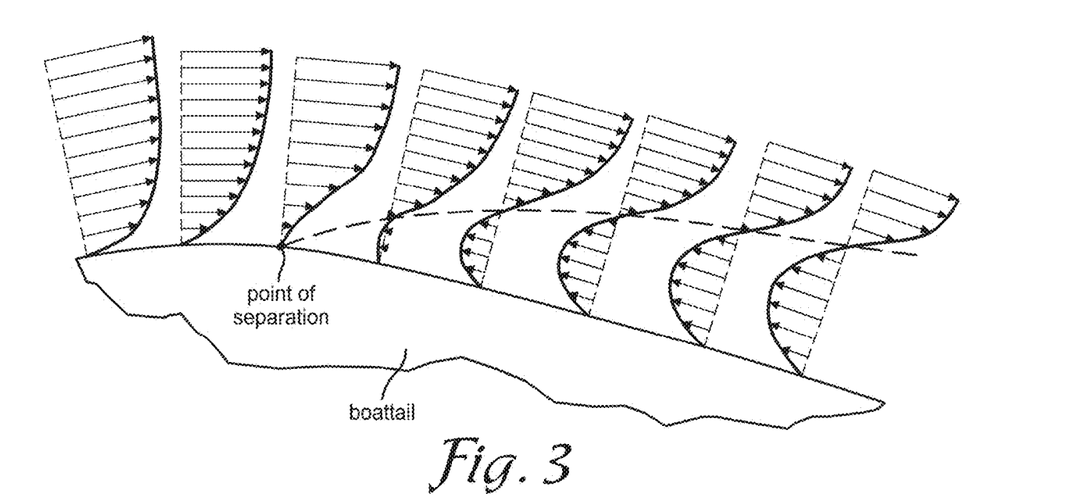
FIG. 3 is a diagram of air flow over the pylon of FIG. 2, illustrating a point of separation at the nacelle boattail where boundary separation occurs.

For example, as depicted in FIG. 2, the nacelle boattail is the portion of the engine nacelle that houses the engine exhaust nozzle and is typically characterized by a significant nacelle cross-sectional area reduction in the direction of the fluid motion external to the nacelle. This nacelle cross-sectional area reduction locally "opens up" a channel defined by the aircraft's fuselage or wing, pylon, and nacelle. A diagram of the air flow within this channel is depicted in FIG. 3, illustrating a point of separation at the nacelle boattail where boundary separation occurs and a series of arrows depicting a direction of air flow. The result is the creation of a strong, localized adverse pressure gradient and the slowing down of the fluid flow, which can lead to significant undesirable boundary layer separation.

Figure 4:
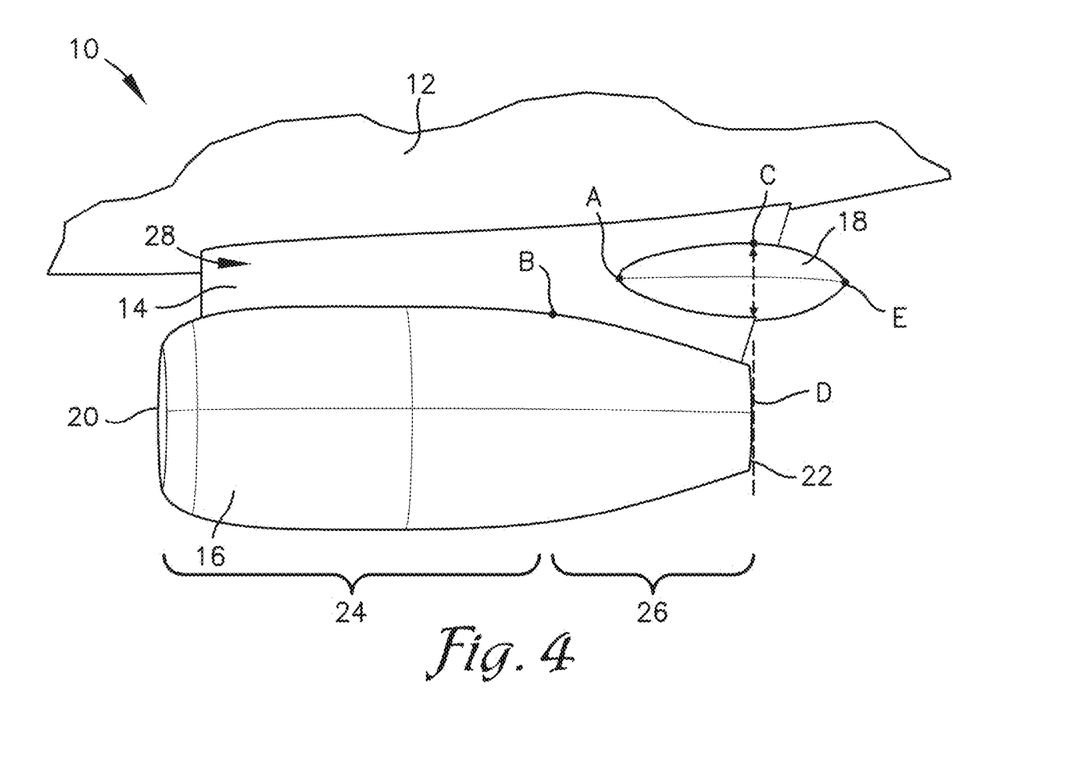
FIG. 4 is a fragmentary elevation view of an aircraft constructed in accordance with embodiments of the present invention, with a short-chord pylon having a protrusion extending therefrom to mitigate or eliminate boundary separation, such as the boundary separation depicted in FIG. 3.

However, the present invention aims to mitigate, if not eliminate, this boundary layer separation at the pylon-nacelle juncture by adding a protrusion to the pylon at a point between the fuselage or wing and the boattail of the nacelle, as is described in detail below. Specifically, as depicted in FIG. 4, an aircraft 10 (or an aircraft body) constructed in accordance with the present invention may comprise an airframe structure such as wings and/or a fuselage 12, a pylon 14, an engine nacelle 16, and a protrusion 18 attached to or formed integral to the pylon. The airframe structure is depicted as the fuselage 12 herein. However, in other embodiments, the fuselage may be a wing or another airframe structure to which the aircraft engine and/or engine nacelle 16 may be mounted via the pylon 14. The wing, fuselage 12, pylon 14, and/or nacelle 16 may comprise aircraft skin attached to frame components. The aircraft skin may be made of aluminum, titanium, titanium alloys, steel, magnesium alloys, composite materials, or other rigid structures.

The nacelle 16 may be any aircraft nacelle known in the art and may surround an aircraft engine (not shown) and the aircraft engine may be mounted via the pylon to the airframe structure (e.g., the wing or the fuselage 12). The nacelle 16 may have a leading end 20 and a trailing nozzle end 22. The nacelle 16 may further comprise a main nacelle body 24 and a nacelle boattail 26, as depicted in FIG. 4. The nacelle boattail 26 may extend from an end of the main nacelle body 24 to the trailing nozzle end 22, tapering to a smaller cross-sectional area gradually from an end of the main nacelle body 24 to the trailing nozzle end 22.

Figure 5:
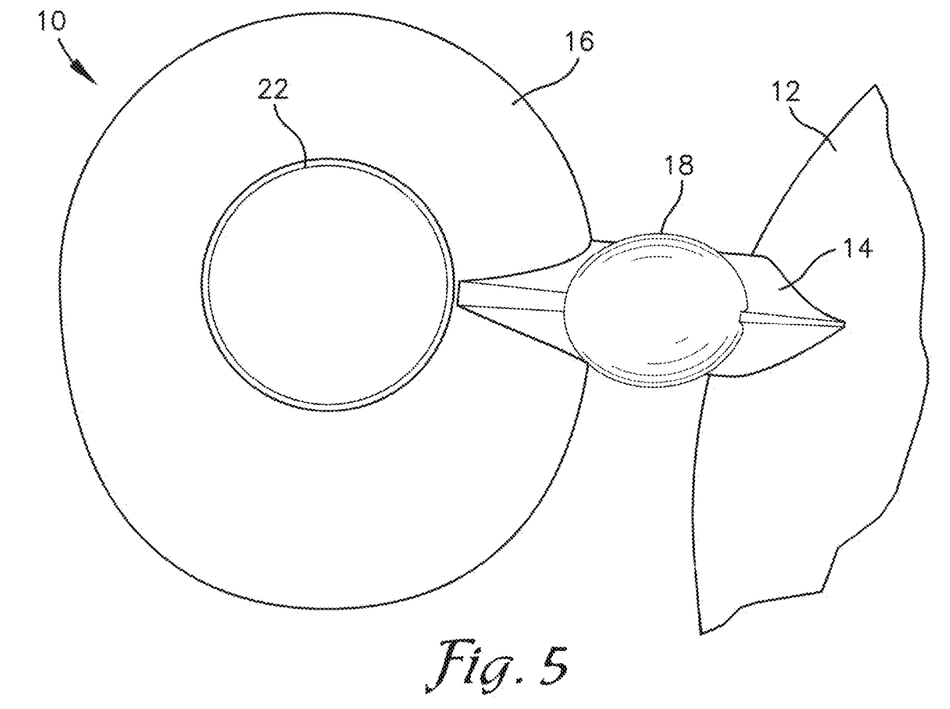
FIG. 5 is a fragmentary aft end view of the aircraft of FIG. 4 in accordance with embodiments of the present invention.
Figure 6:
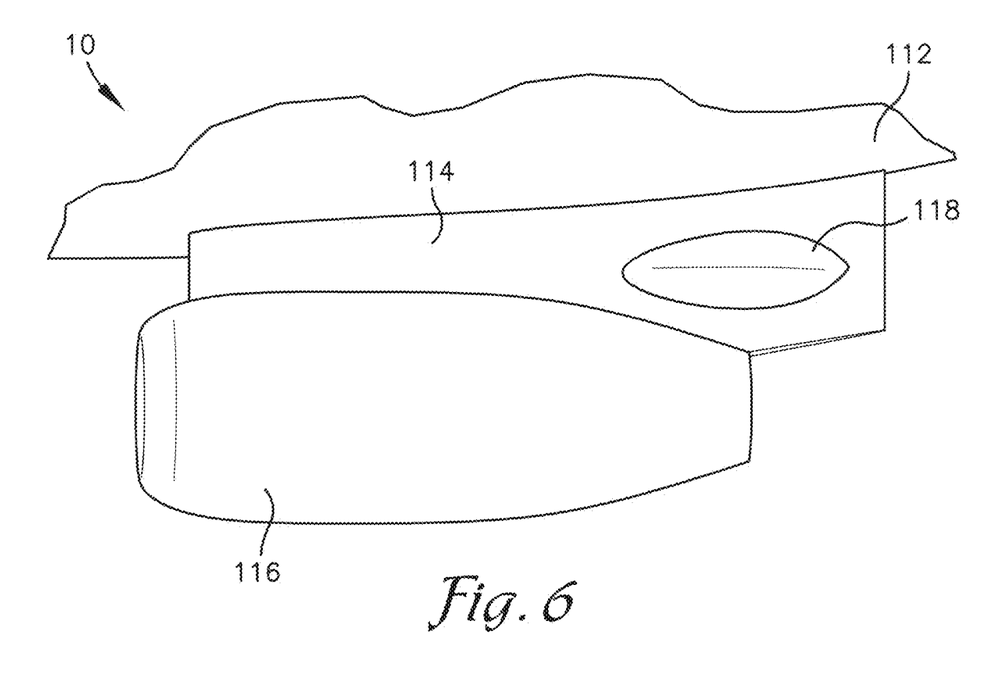
FIG. 6 is a fragmentary elevation view of an aircraft constructed in accordance with embodiments of the present invention, with a long-chord pylon having a protrusion extending therefrom to mitigate or eliminate boundary separation, such as the boundary separation depicted in FIG. 3.
Figure 7:
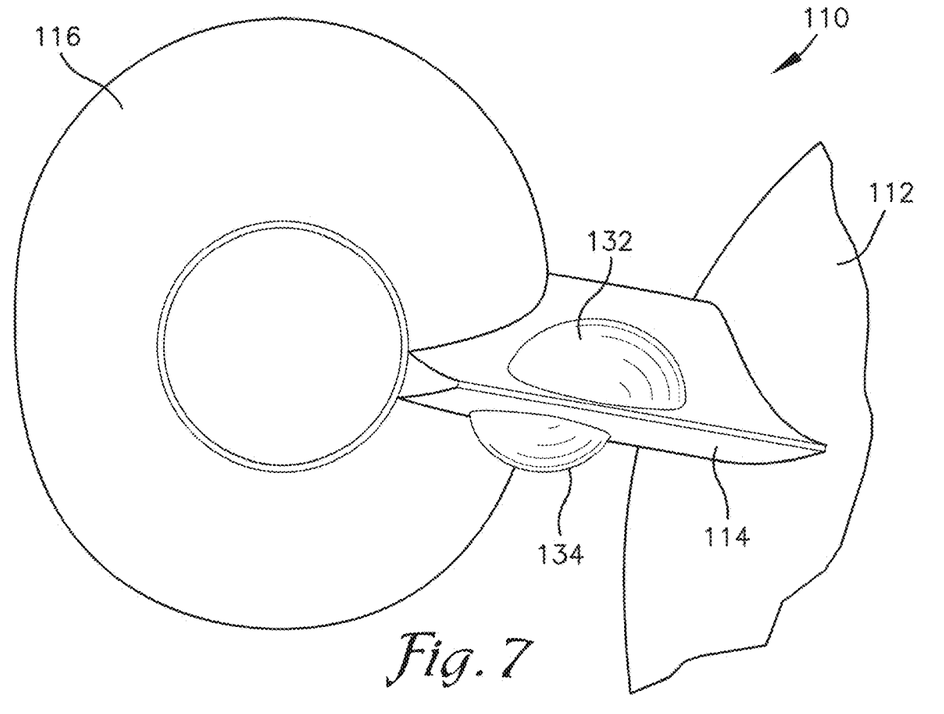
FIG. 7 is a fragmentary aft end view of the aircraft of FIG. 6 in accordance with embodiments of the present invention.

The pylon 14 extending between the airframe (e.g., the fuselage 12) and the nacelle 16 serves to structurally fix the aircraft engine and/or the engine nacelle 16 to the fuselage 12 or the wing or some other airframe structure. The pylon 14 may be a short-chord pylon (as depicted in FIGS. 4-5), a long-chord pylon (as depicted in FIGS. 6-7 and labeled 114), or any pylon known in the art for attaching an aircraft engine and/or the nacelle 16 to the airframe structure (e.g., the fuselage 12). The short-chord pylon may only extend aftward as far back as the trailing nozzle end 22 of the nacelle 16, while the long-chord pylon may extend further aftward than the trailing nozzle end 22 of the nacelle 16. The pylon 14 may be mounted in any direction relative to the airframe structure. However, in some embodiments, the pylon extends downward relative to the fuselage 12 or one of the wings of the aircraft 10. The pylon has a leading edge and a trailing edge and may have a top edge substantially matching a curvature of a surface of the airframe structure to which the pylon is attached and a bottom edge substantially matching a curvature of a surface of the nacelle to which the pylon is attached.

The nacelle's cross-sectional area reduction of the boattail 26, as described above and depicted in FIG. 4, is in the direction of fluid motion external to the nacelle 16 and locally "opens up" a channel 28 defined by the aircraft's fuselage 12 or wing and the nacelle 16. However, at a point where the channel 28 opens up, the protrusion 18 is provided. Specifically, approximately at a point of separation near or at the nacelle boattail 26, where boundary separation traditionally occurs, the protrusion 18 is provided on one or more surfaces of the pylon 14, as described in detail below, to mitigate or eliminate boundary layer separation within the channel 28.

Figure 10:
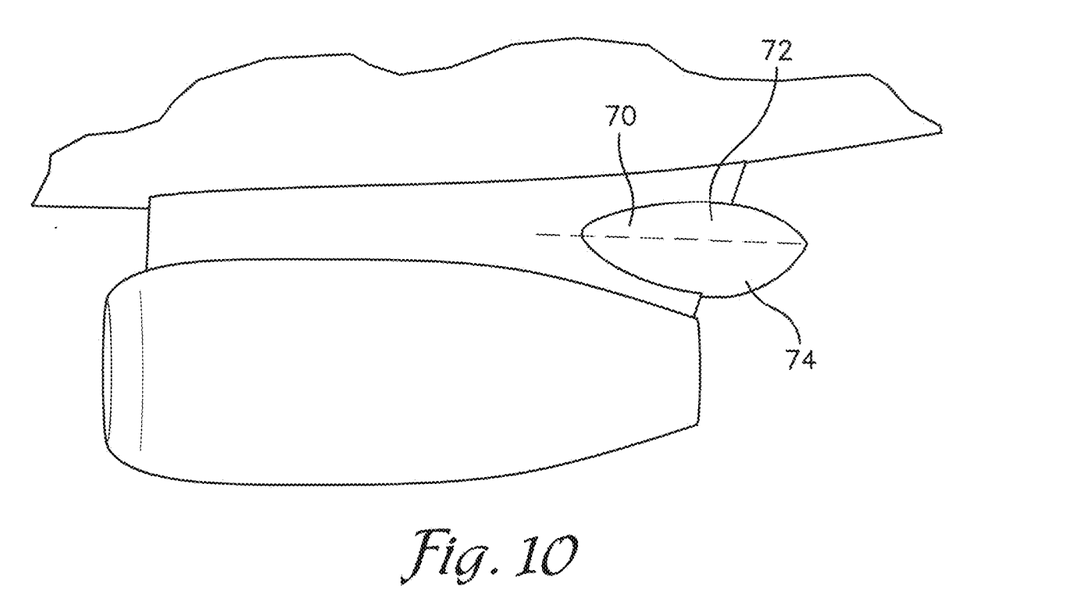
FIG. 10 is an elevation view of an alternative embodiment of the protrusion of FIG. 4, with the protrusion shaped such that inboard and outboard surfaces of the protrusion are asymmetrical having differing widths and/or heights in a middle region thereof.

In some embodiments, the protrusion 18 may include one protrusion extending outward from a first surface of the pylon, two separate protrusions or separate halves of protrusions extending outward from opposing first and second surfaces of the pylon (e.g., see pylon 114 in FIGS. 6-7 described later herein), or a unitary protrusion extending outward from both the first and second opposing surfaces and extending aftward of the pylon (see pylon 14 in FIGS. 4-5). A three-dimensional shape of the protrusion may resemble a "football" (e.g., a prolate spheroid), a "seed", an ellipsoid, or another continuously curved shape protruding from the pylon 14 with an area having a gradually expanding cross-section from a leading end to a middle section and/or a gradually reducing or tapering cross-section from the middle section to a trailing end of the protrusion 18. In embodiments where there are multiple protrusions or a single protrusion extending from only one side of the pylon 14, the protrusion or protrusions may have a shape of a football, prolate spheroid, seed, or ellipsoid split in half. However, other protrusion geometries may be used without departing from the scope of the technology described herein. For example, although the general shape of the protrusion 18 is depicted as substantially symmetrical, other asymmetrical shapes may be used as well. For example, an inboard section 72 and an outboard section 74 (e.g., a portion closer to the nacelle and a portion closer to the fuselage) of a protrusion 70 may be shaped differently as depicted in FIG. 10. Furthermore, the inboard section and outboard section may have different widths and different forward-aft positions at which maximum width occurs without departing from the scopes of the technology disclosed herein.

In some embodiments, the protrusion 18 may comprise at least one bump of a continuous curvature. Furthermore, in some embodiments, the protrusion 18 has a protrusion leading end, a protrusion trailing end, and a middle section somewhere between the protrusion leading end and the protrusion trailing end. A length of the protrusion 18 may be measured from the protrusion leading end to the protrusion trailing end. The protrusion 18 may have an axis extending the length of the protrusion 18, with the axis substantially perpendicular to an axis of the nacelle 16 in some embodiments. However, in other embodiments, the axis of the protrusion 18 may have other orientations relative to the axis of the nacelle 16 without departing from the scope of the disclosure herein.

The middle section of the protrusion 18 can be located at a precise center between the protrusion leading end and the protrusion trailing end, but in some embodiments is not located in the precise center and rather is located at any location between the protrusion leading end and the protrusion trailing end. In some embodiments, a cross-sectional area of the protrusion 18 gradually expands in area from the protrusion leading end to the middle section. Additionally or alternatively, the cross-sectional area of the protrusion 18 may gradually reduce in area from the middle section to the protrusion trailing end. In some embodiments, the middle section is a widest and/or a tallest part of the protrusion 18 and is laterally aligned with the trailing nozzle end 22 of the nacelle 16.

In some embodiments, the protrusion 18 may extend aft (i.e., hang off) the trailing edge of the pylon 14, particularly if, for example, the pylon 14 is a short-chord pylon as depicted in FIGS. 4-5. The protrusion 18 can be integral with skin of the pylon 14, or it can be a separate component that is affixed external to an existing surface of the pylon 14. The latter can allow for simple retrofitting of pre-existing aircraft when there is a boundary layer separation issue to be addressed thereon.

Figure 11:
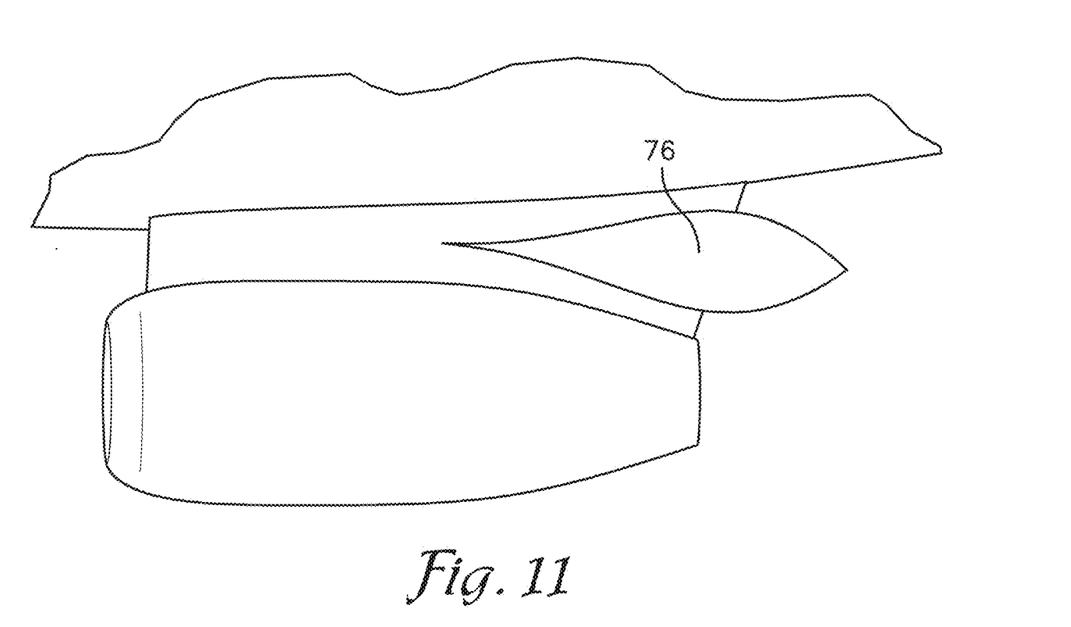
FIG. 11 is an elevation view of another alternative embodiment of the protrusion of FIG. 4, with concave as well as convex surface curvature inflections to further adjust the geometric shape and thus the air flow therewith.

In some example embodiments, a leading edge or forward-most point of the protrusion (e.g., labeled A in FIG. 4) may be located at or slightly aftward relative to a streamwise location of a starting point of the nacelle boattail (e.g., labeled B in FIG. 4). A maximum cross-sectional area of the protrusion may occur at its maximum width and height (e.g., labeled C in FIG. 4). The maximum cross-sectional area may be positioned roughly at a same streamwise location as the trailing nozzle end 22 (at a plane labeled D in FIG. 4). In alternative embodiments, the maximum protrusion height may not be at a same axial position as the maximum protrusion width. Furthermore, other locations of the maximum width and/or height of the protrusion 18 may be used without departing from the scope of the protrusions described herein. For example, the protrusion can be adjusted to be asymmetrical in shape and/or adjusted in relative position forward or aftward, spanwise, or laterally. In some alternative embodiments, as depicted in FIG. 11, a protrusion 76 may have concave and/or convex surface curvature inflections located forward and/or aft of the maximum cross-sectional area position.

A trailing edge or aft-most point of the protrusion (e.g., labeled E in FIG. 4) may be located aftward of point C by an amount configured to assure the boundary layer stays attached over a full extent of the protrusion 18. The width and height of the protrusion 18 can be equal to each other in some embodiments disclosed herein. However, the width and height of the protrusion 18 may be different from each other without departing from the scope of the technology described herein. A longitudinal axis of the protrusion 18 can roughly be aligned with the airstream flowing over the pylon 14. A spanwise or lateral placement between the nacelle 16 and the fuselage 12 or wing can, in some embodiments, be closer to the nacelle 16 than to the fuselage 12 or wing but may be otherwise spanwise or laterally positioned in alternative embodiments without departing from the technology described herein. The protrusion 18 may be wholly contained on the pylon 14, not intersecting with or impinging on the nacelle 16, fuselage 12, or wing. The exact placement, size, shape, and orientation of the protrusion 18 may be unique to a given aircraft and its operational envelope and can be determined by a knowledgeable aerodynamicist skilled in the art, utilizing CFD (Computational Fluid Dynamics) analysis or using other such physical principles, calculations, and analysis known in the art of aerodynamics.

Figure 12:
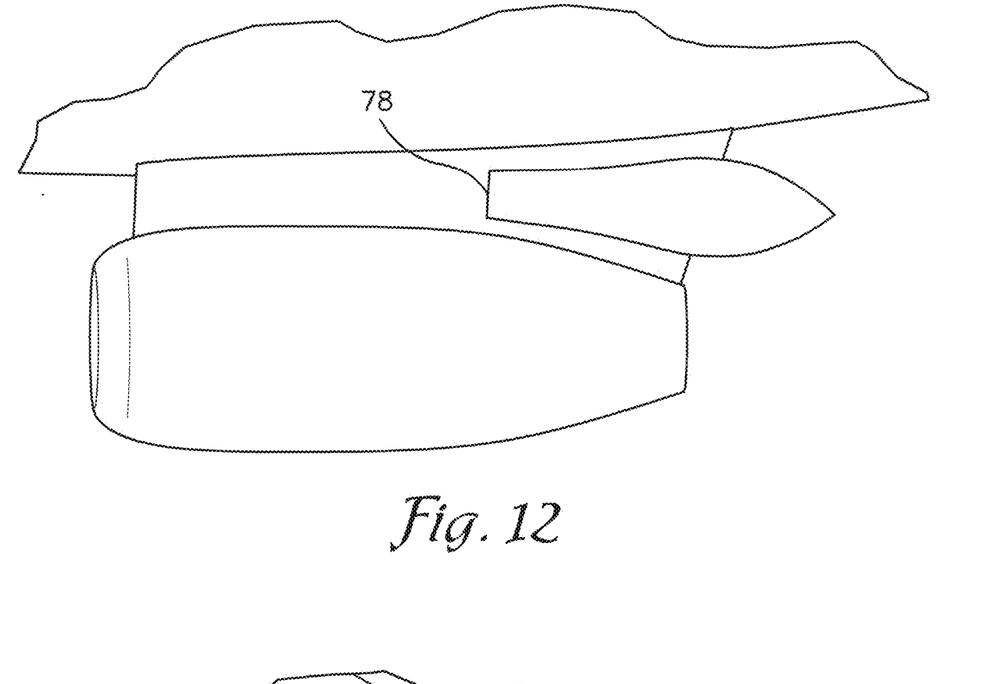
FIG. 12 is an elevation view of another alternative embodiment of the protrusion of FIG. 4, with a front end of the protrusion having a flat edge instead of a point.
Figure 13:
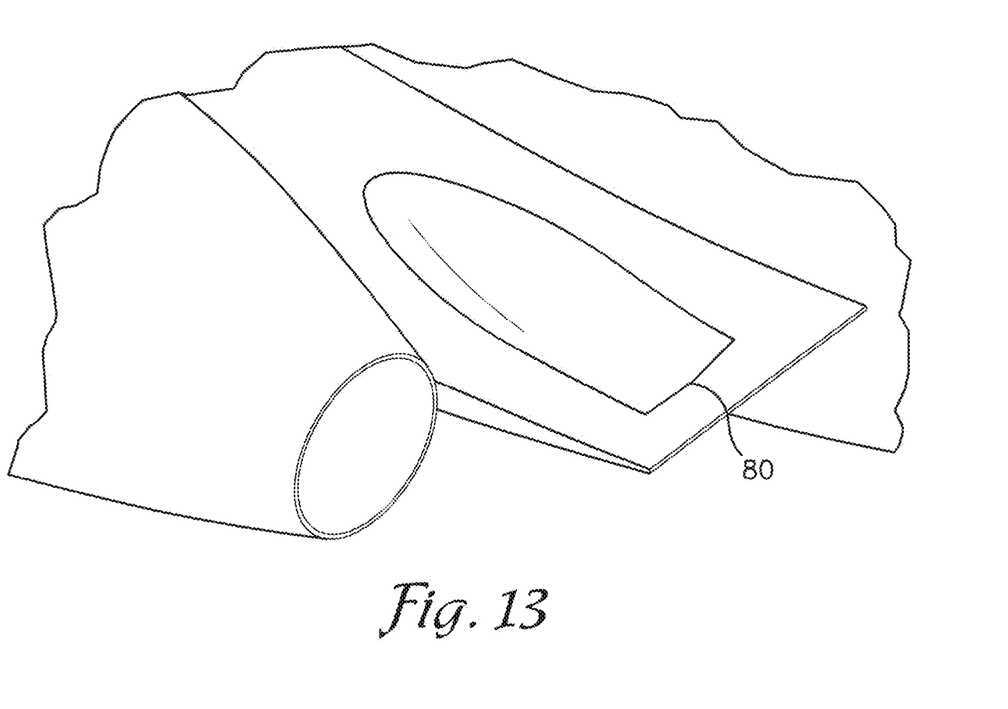
FIG. 13 is a top/side perspective view of another alternative embodiment of the protrusion of FIG. 4, with an aft end of the protrusion having a flat edge instead of a point.
Figure 14A:
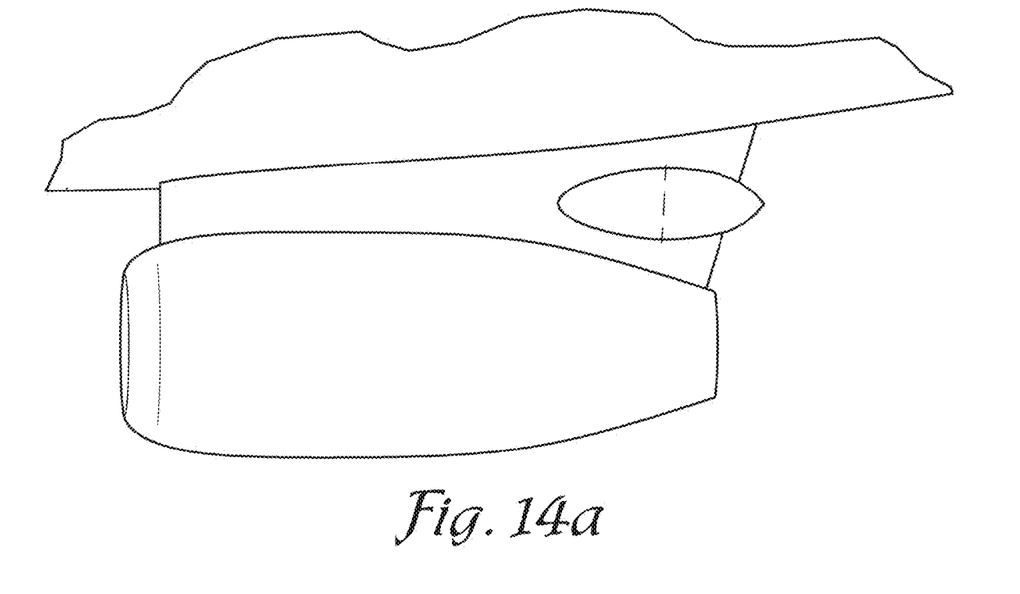
FIG. 14a is an elevation view of an alternative embodiment of the protrusion of FIG. 4, depicting the protrusion positioned more forward than in FIG. 4.
Figure 14B:
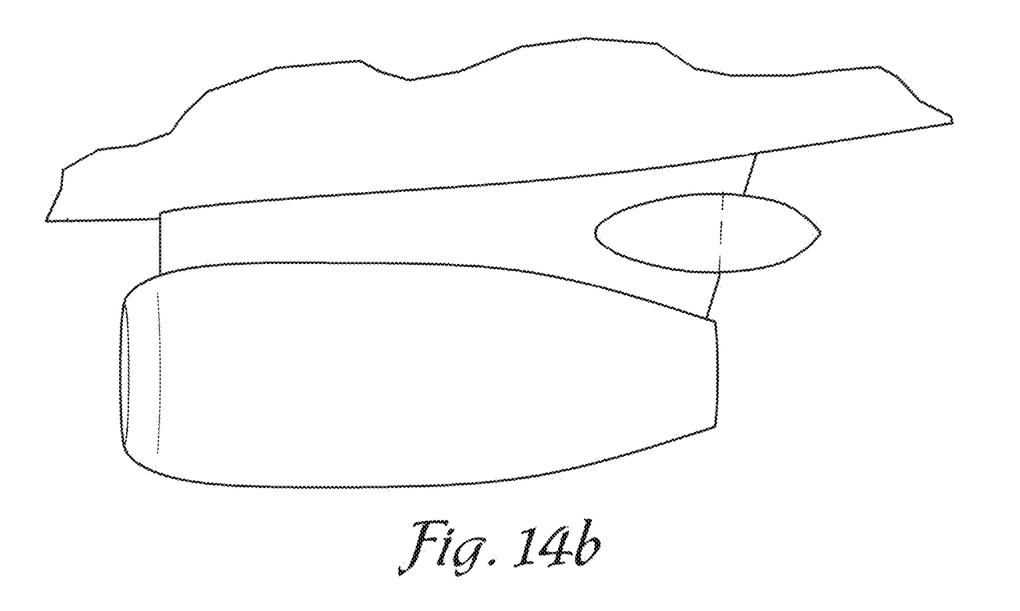
FIG. 14b is an elevation view of the protrusion of FIG. 4, depicting the protrusion positioned in a same location as in FIG. 4.
Figure 14C:
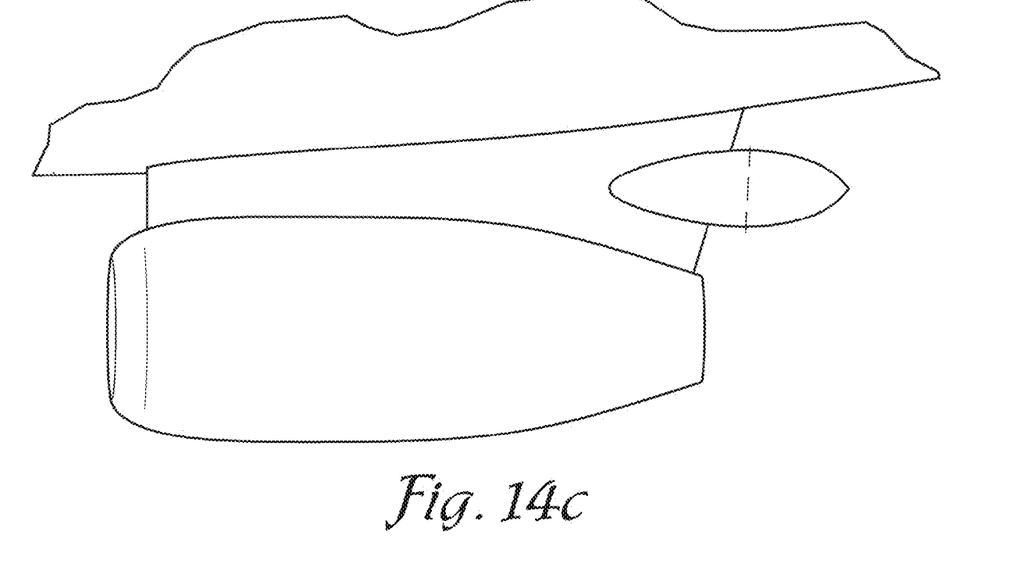
FIG. 14c is an elevation view of an alternative embodiment of the protrusion of FIG. 4, depicting the protrusion positioned more aftward than in FIG. 4.

In some alternative embodiments, as depicted in FIGS. 12-13, the protrusion leading edge 78 and/or the protrusion trailing edge 80 respectively may maintain a width that is similar to that of its maximum width, instead of beginning and terminating in a point as depicted in FIG. 4. As described herein, different halves of the protrusion (e.g., upper and lower surfaces thereof) may be independently shaped as best suited for aerodynamics performance. Furthermore, the maximum cross-sectional area may not always occur at the nozzle trailing nozzle end. That is, in some embodiments, the best position of the maximum cross-sectional area of the protrusion may be forward, in line with, or aft of the trailing nozzle end, as depicted in FIGS. 14a-14c.

FIGS. 6-7 depict an alternative embodiment of the aircraft or aircraft body depicted in FIGS. 4-5. Specifically, an aircraft 110 may have an airframe structure such as a wing or a fuselage 112, a pylon 114, a nacelle 116, and a protrusion 118, each similar to the aircraft 10, fuselage 12, pylon 14, nacelle 16, and protrusion 18 described elsewhere herein. However, the pylon 114 may be a long-chord pylon and may extend downstream of the nacelle 16. In this alternative embodiment the protrusion 118 may, in some embodiments, not extend past the pylon's trailing edge, as depicted in FIGS. 6-7. As depicted in FIG. 7, the protrusion 118 may be divided into two separate halves or may comprise two separate protrusions 132,134, each extending from the pylon's opposing surfaces (e.g., upper surface and lower surface). These two separate protrusions 132,134 may have different placements, sizes, shapes, and orientation from one another. As depicted in FIG. 7, for example, the separate protrusions 132,134 may be offset from each other, with one closer to the nacelle 116 and another closer to the fuselage 112 or wing. However, in other alternative embodiments featuring a long-chord or a short-chord pylon, only a single protrusion on one or the other of the opposing surfaces of the pylon may be provided without departing from the technology described herein. For example, the single protrusion may protrude outward only from an upper surface or only from a lower surface of the pylon.

Figure 8:
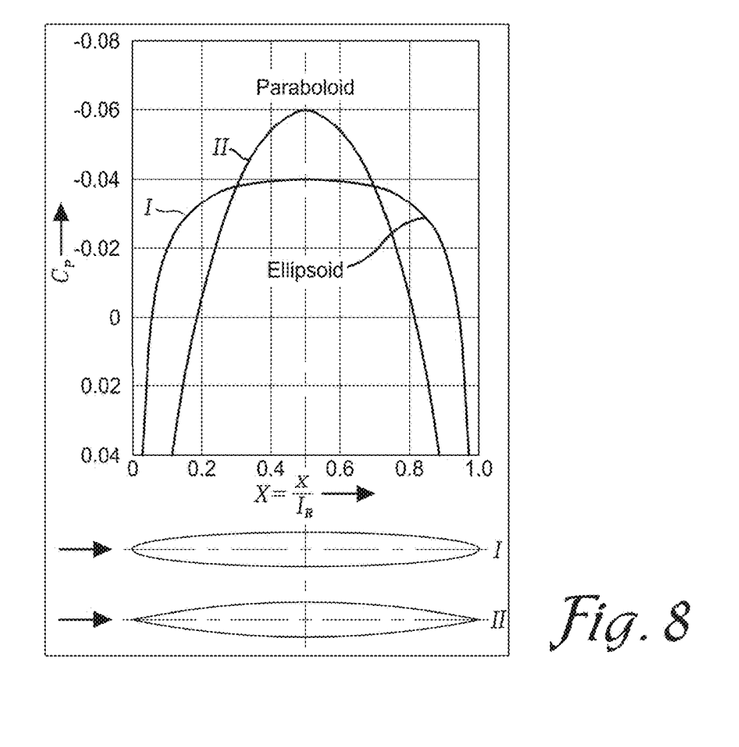
FIG. 8 is a chart graphing example effects of two different pylon protrusions' surface curvatures on pressure distribution about an aerodynamic, streamlined body.

In use, the protrusion 18, protrusion 118, or protrusions 132,134, or any other protrusions described herein, passively modify a pressure field in a region of the nacelle boattail (e.g., the boattail 26) in such a way as to lessen adverse pressure gradient in the airstream direction, thereby, allowing the boundary layer in a nacelle-pylon juncture region to remain substantially attached. For example, the protrusion 18 on the pylon 14 passively modifies a local pressure field through the channel 28 in two principal ways: 1) volume and 2) surface curvature. Specifically, regarding volume, the protrusion 18 partially "fills in" the channel 28 created by the fuselage 12 or wing, pylon 14, and nacelle 16, reducing the air flow path. In accordance with the conservation of mass, the local airstream must increase velocity to maintain a constant air mass-flow rate as a flow path narrows. The faster moving air causes a decrease in local pressure, in accordance with the conservation of energy. Regarding surface curvature, air flowing over a surface is locally accelerated and deaccelerated as a result of the surface shape. The specific shape of the surface has an impact on the characteristics of the pressure field generated about a surface. For example, consider the pressure profiles generated by the two differently shaped protrusions as illustrated and charted in FIG. 8. Flatter protrusion surfaces (those having less streamwise curvature such as the protrusion labeled "I" below the chart in FIG. 8) have a more gradual effect on pressure (i.e., smaller streamwise pressure gradients), while protrusion surfaces with pronounced streamwise curvature (such as the protrusion labeled "II" below the chart in FIG. 8) affect greater pressure change (i.e., larger streamwise pressure gradients).

Figure 9A:
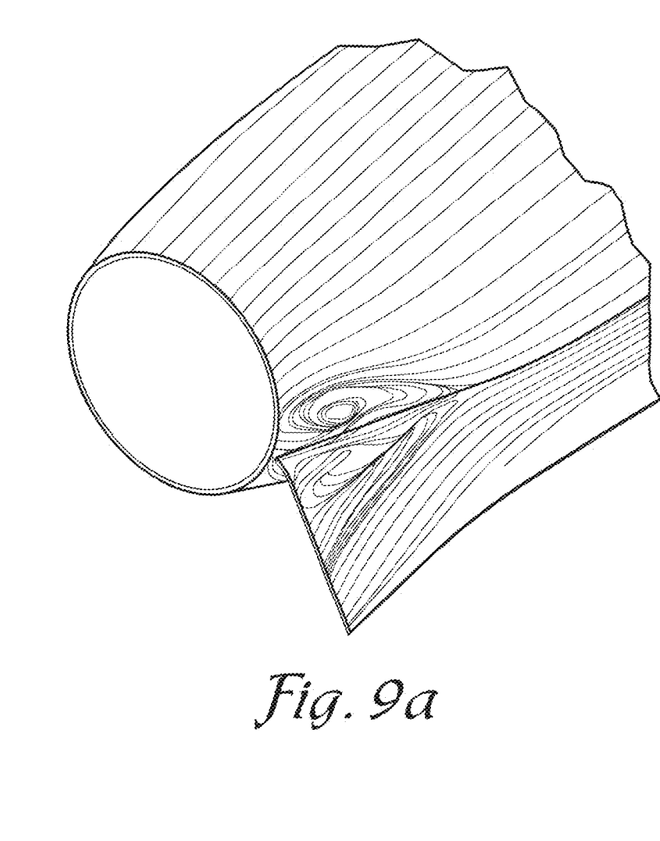
FIG. 9a depicts surface stream traces on an isolated nacelle and pylon without the pylon protrusion.
Figure 9B:
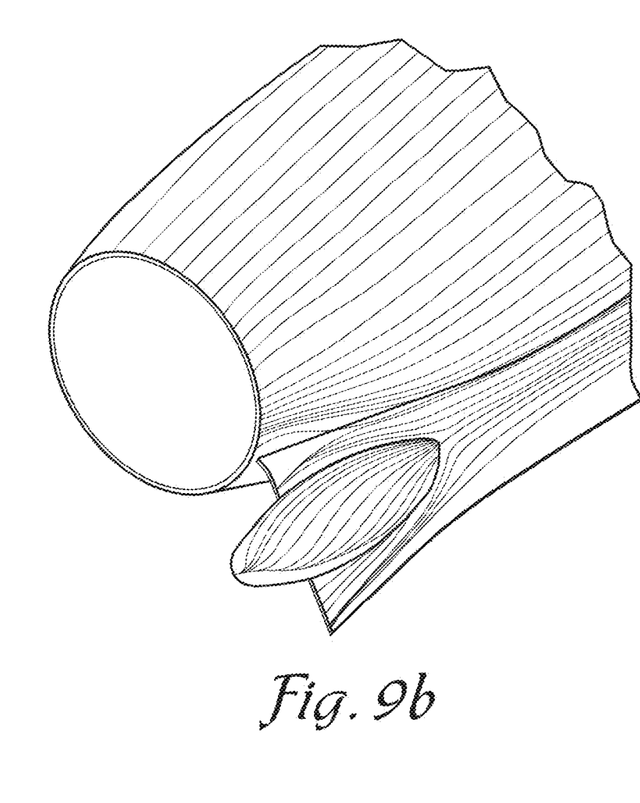
FIG. 9b depicts surface stream traces on an isolated nacelle and pylon with the pylon protrusion.

To determine the size, shape, position, and orientation of the protrusion 18 in the case of the short-chord pylon (e.g., FIGS. 4-5) or separate upper and lower pylon protrusions 132,134 in the case of the long-chord pylon (e.g., FIGS. 6-7), a skilled aerodynamicist can use CFD analysis to assess the surface pressure distribution, surface skin friction distribution, and surface stream traces about the pylon-nacelle juncture in the nacelle boattail's region, when no pylon protrusion is present. This analysis may give the aerodynamicist insight into the existence, location, orientation, and severity of adverse pressure gradients, as well as identifying air flow boundary layer separation occurrences. Other flow properties at the surface, in the boundary layer, or in the airstream may also be assessed at the discretion of the aerodynamicist. In general, if a flow separation "wedge" is seen in the surface stream traces, as depicted in an air flow model in FIG. 9a, then a protrusion can be designed and incorporated into the pylon surface to mitigate the separation, as depicted in an air flow model in FIG. 9b. Note that the surface stream traces depicted by the series of lines in FIGS. 9a and 9b may also each include a series of spaced-apart arrows (not shown) in some air flow models, depicting the direction of flow (e.g., flowing generally aftward toward the trailing ends of both the pylon and the nacelle respectively). The protrusion design may be iteratively manipulated, either manually or in an automatic optimization procedure, with the goal of reducing boundary layer separation and minimizing aerodynamic drag at pre-identified flight conditions (e.g., combinations of Mach number and altitude), which are determined by a particular aircraft's flight operation.

Practical implementation of the invention may require the accommodation of other design considerations, including but not limited to structural load paths, manufacturing processes, and systems integration. In the case of transonic and/or supersonic flight, air compressibility considerations can influence the protrusion design. For example, the size or length of the protrusion may be manipulated to affect the local cross-sectional area distribution to mitigate compressibility or wave drag.

Figure 15:
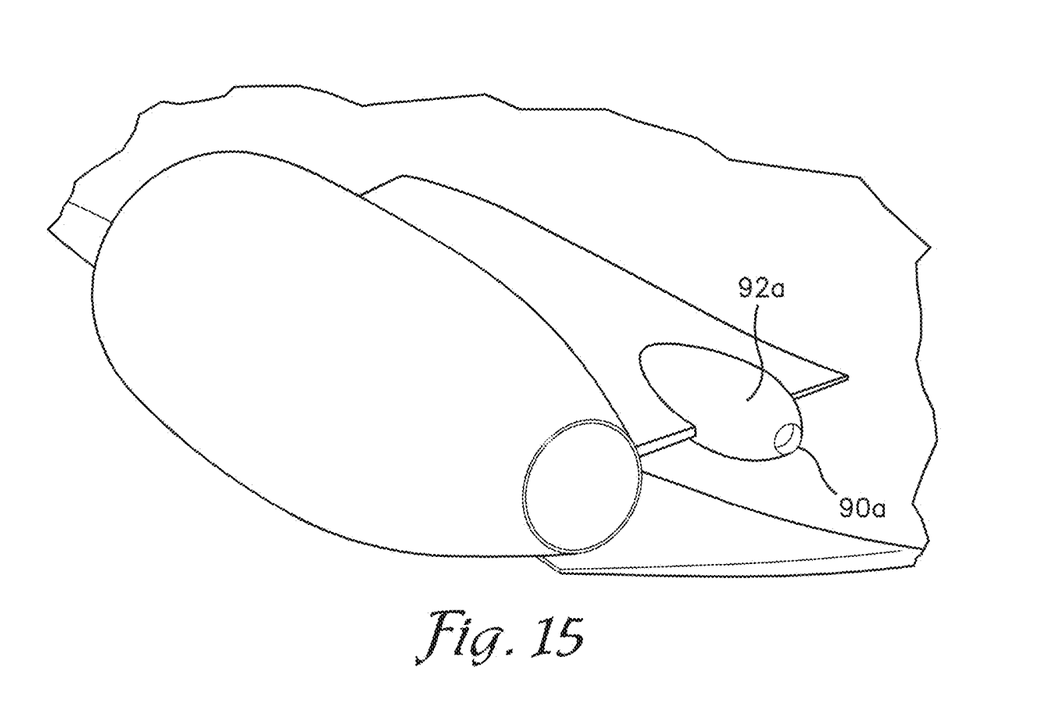
FIG. 15 is a top aft perspective view of an alternative embodiment of the protrusion of FIG. 4 with a vent hole at an aft end in accordance with some embodiments herein.
Figure 16:
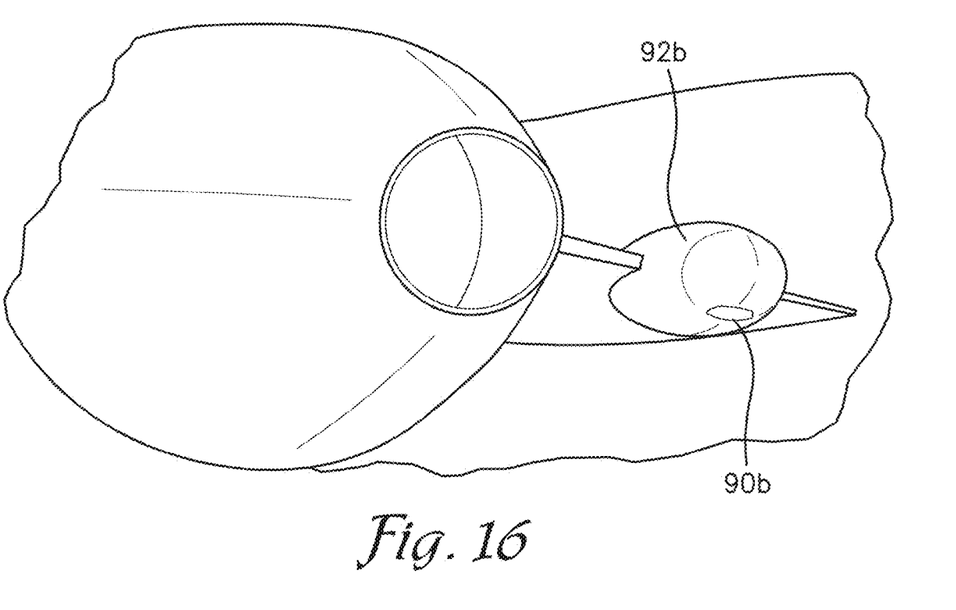
FIG. 16 is a bottom aft perspective view of an alternative embodiment of the protrusion of FIG. 4 with a vent hole on a lower surface near an aft end of the protrusion in accordance with some embodiments herein.

If aircraft radar detection is a concern, the protrusion design can incorporate radar reflectivity considerations. Furthermore, various systems may be housed within the pylon 14, for example an engine bleed air pre-cooler, and such systems may utilize the additional internal volume gained by the implementation of the protrusion 18 or protrusions. The protrusion 18 may also provide a convenient or efficient location to intake or ventilate air for system operation. For example, in some embodiments, vents 90a,90b may be formed through at least a portion of a surface of the protrusion or protrusions 92a,92b and may serve as an air intake vent or to ventilate out from within the pylon 14, as depicted in alternative example embodiments in FIGS. 15 and 16. Additionally or alternatively, the protrusion 18 may be configured to house and/or provide an aerodynamically fairing (covering) over a sensor or actuator of the aircraft 10.

Note that the protrusion 18, protrusion 118, or protrusions 132,134 can have a similar effect on the pylon-fuselage or pylon-wing juncture as it does on the pylon-nacelle juncture, promoting boundary layer attachment by manipulating the local pressure field. However, the pylon-nacelle juncture may generally be more susceptible to boundary layer separation due to the nacelle boattail's tapered geometry.

The configurations described herein advantageously control juncture flow separation. Although the invention depicted and described herein primarily focuses on embodiments in which an engine pylon is mounted to a fuselage, note that the engine nacelle may be mounted to a wing via a pylon without departing from the scope of the technology described herein. Furthermore, the addition of a protrusion as described herein can additionally or alternatively be used on other external surfaces of the aircraft where boundary layer attachment is a concern (e.g., placing the protrusion within any channel of increasing area, with the protrusion positioned, sized, and shaped to mitigate boundary layer separation). For example, an aircraft body may have a plurality of aircraft external surfaces (e.g., two or three different aircraft external surfaces, such as the aircraft skin of a fuselage, wing, pylon, nacelle, or the like). Those aircraft external surfaces may cooperatively form a channel extending in a forward to aftward direction. An aft portion of the channel may gradually increase in cross-sectional area in the forward to aftward direction (e.g., similar to the channel cooperatively formed by the fuselage, pylon, and nacelle in FIGS. 4-7). In this example embodiment, the aircraft body may have a juncture or joint at which two adjacent ones of the aircraft external surfaces meet, and a protrusion may extend outward from one of the two adjacent ones of the aircraft external surfaces into the aft portion of the channel. The protrusion is spaced apart from the juncture and is sized and shaped to mitigate boundary layer separation within the aft portion of the channel when a flow of air moves through the channel in the forward to aftward direction.

Throughout this specification, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current invention can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although the technology has been described with reference to the embodiments illustrated in the attached drawing figures, it is noted that equivalents may be employed and substitutions made herein without departing from the scope of the technology as recited in the claims.

Having thus described various embodiments of the technology, what is claimed as new and desired to be protected by Letters Patent includes the following:

1. An aircraft body comprising:
   an airframe structure;
   a pylon having a first end, a second end opposite the first end, a first surface extending between the first end and the second end, and a second surface opposite the first surface, wherein the first end is fixed to the airframe structure;
   at least one protrusion extending outward from at least one of the first surface and the second surface of the pylon, wherein the at least one protrusion forms a bump of a continuous curvature, wherein the at least one protrusion has a protrusion leading end, a protrusion trailing end, and a middle section somewhere between the protrusion leading end and the protrusion trailing end, wherein a cross-sectional area of the at least one protrusion gradually expands in size from the protrusion leading end to the middle section; and
   a nacelle at the second end of the pylon, the nacelle having a leading end, a trailing end, and a tapered boattail at the trailing end, wherein at least a portion of the at least one protrusion is located between the airframe structure and the tapered boattail, wherein the middle section of the at least one protrusion is at least one of a widest and a tallest part of the at least one protrusion and is laterally aligned with the trailing end of the nacelle.

2. The aircraft body of claim 1, wherein the cross-sectional area of the at least one protrusion gradually reduces in size from the middle section to the protrusion trailing end.

3. The aircraft body of claim 1, wherein the at least one protrusion is shaped like a prolate spheroid or an ellipsoid.

4. The aircraft body of claim 1, wherein a portion of the at least one protrusion extends aftward of the pylon.

5. The aircraft body of claim 1, wherein the at least one protrusion comprises a first protrusion on the first surface of the pylon and a second protrusion on the second surface of the pylon.

6. The aircraft body of claim 5, wherein the first protrusion has at least one of a different size, different shape, and different location than the second protrusion.

7. The aircraft body of claim 1, wherein the protrusion is closer to the nacelle than to the airframe structure.

8. The aircraft body of claim 1, wherein the airframe structure is a fuselage or a wing.

9. An aircraft comprising:
   a fuselage;
   a pylon having a first end, a second end opposite the first end, a first surface extending between the first end and the second end, and a second surface opposite the first surface, wherein the first end is fixed to the fuselage;
   a first protrusion that extends outward from the first surface of the pylon, wherein the first protrusion has vents formed through at least a portion of the first protrusion;
   an aircraft engine fixed to the second end of the pylon; and
   a nacelle formed around the aircraft engine, the nacelle having a leading end, a trailing end, and a tapered boattail at the trailing end, wherein the first protrusion is located between the fuselage and the tapered boattail, wherein the first protrusion has a protrusion leading end, a protrusion trailing end, and a middle section somewhere between the protrusion leading end and the protrusion trailing end, wherein a cross-sectional area of the first protrusion gradually expands in size from the protrusion leading end to the middle section.

10. The aircraft of claim 9, wherein the cross-sectional area of the first protrusion gradually reduces in size from the middle section to the protrusion trailing end.

11. The aircraft of claim 9, wherein the first protrusion is a raised bump of a continuous curvature, integrally formed with the pylon.

12. The aircraft of claim 9, further comprising a second protrusion that extends outward from the second surface of the pylon.

13. The aircraft of claim 12, wherein the first protrusion has at least one of a different size, different shape, and different location than the second protrusion.

14. An aircraft comprising:
a fuselage;
a pylon having a first end, a second end opposite the first end, a first surface extending between the first end and the second end, and a second surface opposite the first surface, wherein the first end is fixed to the fuselage;
a first protrusion that extends outward from the first surface of the pylon, wherein the first protrusion is a raised bump of a continuous curvature, integrally formed with the pylon;
a sensor at least partially located within the first protrusion or an actuator at least partially located within the first protrusion;
an aircraft engine fixed to the second end of the pylon; and
a nacelle formed around the aircraft engine, the nacelle having a leading end, a trailing end, and a tapered boattail at the trailing end, wherein the first protrusion is located between the fuselage and the tapered boattail, wherein the first protrusion has a protrusion leading end, a protrusion trailing end, and a middle section somewhere between the protrusion leading end and the protrusion trailing end, wherein a cross-sectional area of the first protrusion gradually expands in size from the protrusion leading end to the middle section.

15. The aircraft of claim 14, wherein the cross-sectional area of the first protrusion gradually reduces in size from the middle section to the protrusion trailing end.

16. The aircraft of claim 14, further comprising a second protrusion that extends outward from the second surface of the pylon.

17. The aircraft of claim 16, wherein the first protrusion has at least one of a different size, different shape, and different location than the second protrusion.

* * * * *